(12) United States Patent
Matsuda et al.

(10) Patent No.: US 11,428,977 B1
(45) Date of Patent: *Aug. 30, 2022

(54) OCCLUDER / DIMMER BASED ON POLARIZATION-SELECTIVE SCATTERER AND NEAR-EYE DISPLAY CONTAINING SAME

(71) Applicant: Facebook Technologies, LLC, Menlo Park, CA (US)

(72) Inventors: Nathan Matsuda, Seattle, WA (US); Douglas Robert Lanman, Bellevue, WA (US); Afsoon Jamali, Redmond, WA (US); Jasmine Soria Sears, Redmond, WA (US); Oleg Yaroshchuk, Redmond, WA (US); Alireza Moheghi, Bothell, WA (US)

(73) Assignee: Meta Platforms Technologies LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/222,464

(22) Filed: Apr. 5, 2021

Related U.S. Application Data

(63) Continuation of application No. 16/573,061, filed on Sep. 17, 2019, now Pat. No. 11,009,737.

(51) Int. Cl.
*G02F 1/1335* (2006.01)
*G02B 27/01* (2006.01)
(Continued)

(52) U.S. Cl.
CPC ... *G02F 1/133504* (2013.01); *G02B 27/0093* (2013.01); *G02B 27/0172* (2013.01);
(Continued)

(58) Field of Classification Search
None
See application file for complete search history.

(56) References Cited

U.S. PATENT DOCUMENTS

| 11,009,737 B1* | 5/2021 | Matsuda ............ G02B 27/0093 |
| 2005/0094064 A1 | 5/2005 | Iijima |

(Continued)

FOREIGN PATENT DOCUMENTS

| JP | 2002090527 A | * | 3/2002 |

OTHER PUBLICATIONS

Amimori et. al., Optomechanical properties of PDLC films for scattering polarizer applications J.Appl.Phys., 93(6), 3248 (2003).

(Continued)

*Primary Examiner* — Shan Liu
(74) *Attorney, Agent, or Firm* — Pequignot + Myers; Matthew A. Pequignot

(57) ABSTRACT

A configurable occluder/dimmer for a near-eye display includes an array of polarization rotators and a polarization-selective scatterer downstream of the array of polarization rotators. The array of rotators and the polarization-selective scatterer are disposed between a pair of polarizers. The polarization-selective scatterer only scatters light at one of two orthogonal polarizations, thereby enhancing the achieved extinction ratio of the configurable occluder/dimmer. The configurable occluder/dimmer may be used in the near-eye display to provide occlusion effects rendering added virtual objects opaque, and/or to equalize contrast of the generated virtual imagery across the field of view of the display.

20 Claims, 13 Drawing Sheets

(51) Int. Cl.
   *G02B 27/28*   (2006.01)
   *G02B 27/00*   (2006.01)

(52) U.S. Cl.
   CPC ..... *G02B 27/281* (2013.01); *G02F 1/133528* (2013.01); *G02B 2027/0178* (2013.01)

(56)                References Cited

U.S. PATENT DOCUMENTS

| | | |
|---|---|---|
| 2006/0152649 A1 | 7/2006  | Yanagida |
| 2016/0349607 A1 | 12/2016 | Qin |
| 2017/0082895 A1 | 3/2017  | Sakai et al. |
| 2017/0184894 A1 | 6/2017  | Hayashi et al. |
| 2017/0205663 A1 | 7/2017  | Fukunaga et al. |
| 2018/0031875 A1 | 2/2018  | Qin et al. |
| 2019/0129246 A1 | 5/2019  | Masuda |
| 2020/0074724 A1 | 3/2020  | Mathur et al. |

OTHER PUBLICATIONS

F. Bloisi et al., Optoelectronic polarizer by PDLC. Liq.Cryst., 20(3), 377 (1996).

Lee et al. "Optical properties of reflective liquid crystal polarization volume gratings" vol. 36, No. 5 / May 2019 / Journal of the Optical Society of America B.

\* cited by examiner

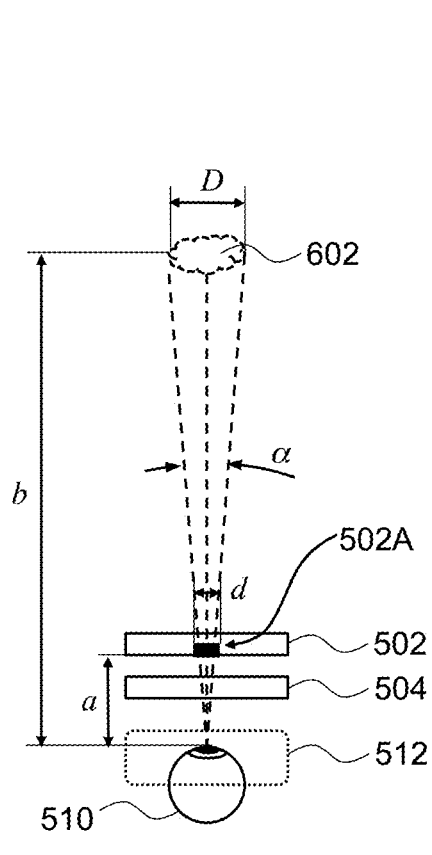
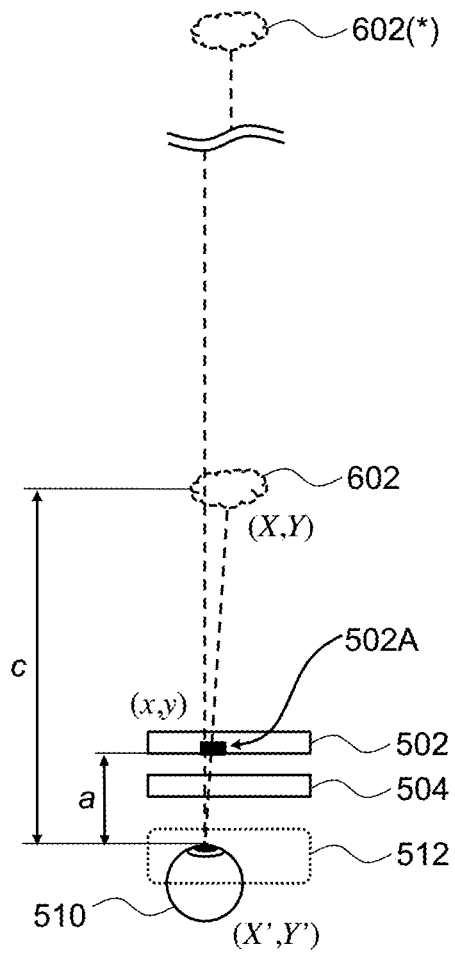
FIG. 7A
FIG. 7B

OCCLUDER / DIMMER BASED ON POLARIZATION-SELECTIVE SCATTERER AND NEAR-EYE DISPLAY CONTAINING SAME

REFERENCE TO RELATED APPLICATION

The present invention is a continuation of U.S. patent application Ser. No. 16/573,061 filed on Sep. 17, 2019 and incorporated herein by reference in its entirety.

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and bio-medical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user's eye directly, without an intermediate screen or a display panel. An imaging waveguide is used to carry the image in angular domain to the user's eye. The lack of a screen or a display panel in a scanning projector display enables size and weight reduction of the display.

Wearable displays may be constructed to enable the viewer observe the outside environment while viewing the generated imagery, text, and other generated content. The added virtual content may visually interfere with the observed outside environment, causing eyestrain and confusion to the viewer and, in some cases, rendering the added visual information indiscernible.

SUMMARY

In accordance with the present disclosure, there is provided a configurable occluder comprising a first polarizer for polarizing an impinging light beam to obtain a first light beam having a first polarization state. An array of polarization rotators is disposed downstream of the first polarizer for receiving the first light beam and changing polarization of the first light beam in a spatially selective manner from the first polarization state to a second polarization state orthogonal to the first polarization state, to obtain a second light beam. A polarization-selective scatterer is disposed downstream of the array of polarization rotators for receiving the second light beam and scattering a first portion of the second light beam having one of the first or second polarization states while transmitting a second portion of the second light beam having the other one of the first or second polarization states. A second polarizer is disposed downstream of the polarization-selective scatterer for transmitting therethrough the second portion of the second light beam.

In some embodiments, the polarization-selective scatterer comprises a polymer-stabilized liquid crystal layer comprising liquid crystal molecules dispersed in and aligned by a polymer network extending in a direction perpendicular to a plane of polarization of the second portion of the second light beam, whereby the liquid crystal molecules are oriented to have a uniform refractive index for the second portion of the second light beam, and a different, spatially varying refractive index for the first portion of the second light beam, for scattering the first portion of the second light beam. In some embodiments, the polarization-selective scatterer comprises a polymer-dispersed liquid crystal layer comprising liquid crystal droplets dispersed in a polymer network, wherein liquid crystal molecules in the droplets are aligned predominantly in a direction perpendicular to a plane of polarization of the second portion of the second light beam, whereby the liquid crystal molecules are oriented to have a uniform refractive index for the second portion of the second light beam, and a different, spatially varying refractive index for the first portion of the second light beam, for scattering the first portion of the second light beam.

In embodiments where the first and second polarization states are circular polarization states of opposite handedness, the polarization-selective scatterer may include a polarization volume hologram comprising liquid crystal molecules in a periodic cholesteric configuration including a plurality of helical structures, whereby the liquid crystal molecules are oriented to have a uniform refractive index for the second portion of the second light beam, and a different, spatially varying refractive index for the first portion of the second light beam, for scattering the first portion of the second light beam. The polarization-selective scatterer may also include a Pancharatnam-Berry polarization-selective diffuser configured to scatter the first portion of the second light beam while flipping its polarization handedness, and transmit the second portion of the second light beam while flipping its polarization handedness.

The polarization-selective scatterer may further include first and second transparent electrodes. The polymer-stabilized liquid crystal layer, the polymer-dispersed liquid crystal layer, the polarization volume hologram, and/or the Pancharatnam-Berry polarization-selective diffuser may be disposed between the first and second transparent electrodes for electric control of amount of scattering of the first portion of the second light beam by the polymer-dispersed liquid crystal layer. At least one of the first or second transparent electrodes may be pixelated for spatially-selective control of the amount of scattering of the first portion of the second light beam. The array of polarization rotators may include a liquid crystal array.

In accordance with the present disclosure, there is provided a see-through near-eye display device comprising a configurable occluder described above and a see-through display module downstream of the configurable occluder, for providing display light conveying an image in angular domain to a user, and for transmitting light propagated through the second polarizer of the configurable occluder. The see-through display module may be transparent at a polarization state of the second portion of the second light beam, and the display light may be polarized orthogonally to the polarization state of the second portion of the second light beam.

The see-through display module may further include a pupil-replicating waveguide and an image projector optically coupled to the pupil-replicating waveguide for providing the display light to the pupil-replicating waveguide. A controller may be operably coupled to the see-through display module and the array of polarization rotators and configured to operate the array of polarization rotators of the configurable occluder to dim the corresponding portion of the outside environment, and to operate the see-through display module to provide the display light carrying the image to be displayed. In some embodiments, the see-through near-eye display device further comprises an eye tracker for determining at least one of position or orientation of an eye of the user. In such embodiments, the controller may be further configured to use the eye tracker to determine the at least one of the eye position or orientation of the eye of the user; determine parallax of an occluding area of the configurable occluder corresponding to the occluding region of the image, in accordance with the at least one of the eye position or orientation; and adjust the occluding area to account for the parallax of the occluding area.

In accordance with the present disclosure, there is further provided a see-through near-eye display device comprising a tunable dimmer comprising a first polarizer for polarizing light from outside environment to obtain a first light beam having a first polarization state, a tunable polarization rotator downstream of the first polarizer, for receiving the first light beam and changing polarization of the first light beam by a controllable amount, to obtain a second light beam, a polarization-selective scatterer downstream of tunable polarization rotator, for receiving the second light beam and scattering a first portion of the second light beam having one of first or second polarization states while transmitting a second portion of the second light beam having the other one of the first or second polarization states, and a second polarizer downstream of the polarization-selective scatterer, for transmitting therethrough the second portion of the second light beam. The see-through near-eye display device further includes a see-through display module downstream of the tunable dimmer, for providing display light conveying an image in angular domain to a user, and for transmitting light propagated through the second polarizer of the tunable dimmer.

In some embodiments, the see-through near-eye display device further includes an eye tracker for determining at least one of position or orientation of an eye of the user, a camera for determining brightness of the outside environment, and a controller operably coupled to the see-through display module, the tunable polarization rotator, the camera, and the eye tracker. The controller may be configured to use the eye tracker to determine a gaze direction of the user, use the camera to determine brightness of the outside environment in the gaze direction, operate the tunable polarization rotator of the tunable dimmer to dim the outside environment in accordance with the brightness of the outside environment in the gaze direction, and operate the see-through display module to provide the image to be displayed to the user. The tunable polarization rotator may be pixelated for spatially varying a polarization state of the second light beam to dim the outside environment in a spatially-variant manner. The see-through near-eye display device may further include a camera for determining an angular distribution of brightness of the outside environment, and a controller operably coupled to the see-through display module, the tunable polarization rotator, and the camera. The controller may be configured to use the camera to determine an angular distribution of brightness of the outside environment, operate the pixelated tunable polarization rotator of the tunable dimmer to dim the outside environment in a spatially-variant manner in accordance with the angular distribution of brightness of the outside environment, and operate the see-through display module to provide the image to be displayed to the user.

BRIEF DESCRIPTION OF THE DRAWINGS

Exemplary embodiments will now be described in conjunction with the drawings, in which:

FIG. 7A is a schematic cross-sectional view of a near-eye display illustrating the principle of selecting a size of an occluding area of the configurable occluder based on angular size of an occluding region of the image;

FIG. 7B is a schematic cross-sectional view of a near-eye display illustrating the principle of selecting a position of an occluding area of the configurable occluder based on parallax of the occluding region of the image;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

To better highlight the added virtual content, a wearable display may include an occluder device, which may be configured to selectively dim the outside environment at an area where a virtual object is to be displayed. Such a configurable occluder may utilize polarization properties of light. An array or panel of polarization rotators between a pair of polarizers may be placed behind a transparent or a semi-transparent display providing virtual images to the user. When the individual polarization rotators of the array are activated, the polarization of light changes, attenuating or blocking some of the ambient light at the location of the displayed virtual object, improving the contrast of the virtual object and/or making the virtual object appear to obscure the real-world imagery, and consequently causing the virtual object to appear opaque.

Brightness of outside environment may vary by many orders of magnitude both across the outside imagery and with time, and the extinction ratio of polarization-based configurable occluders may be insufficient to attenuate brightly lit areas of the outside world to the viewer. For instance, laminated polarizer sheets used in combination with liquid crystal display panels typically have an extinction ratio not exceeding several hundreds, which limits their occlusion capacity. In accordance with the present disclosure, an occlusion capability of a polarization-based configurable occluder may be enhanced by using a polarization-selective scatterer in an optical path between the polarizers. Depending on configuration, the polarization-selective scattering may operate in synergy with the attenuation provided by an output polarizer of the occluder, effectively enhancing the extinction ratio of the occluder.

Figure 1A:
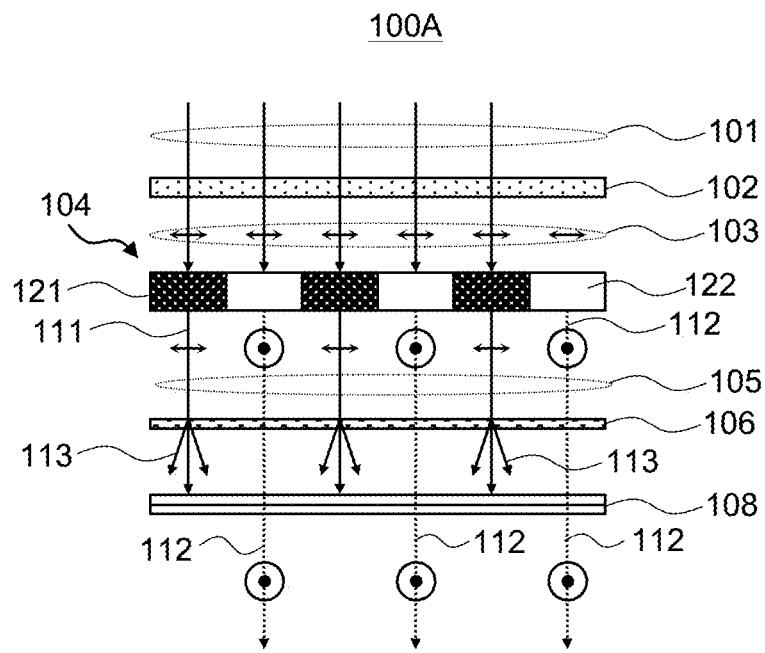
FIG. 1A is a schematic cross-sectional view of a configurable occluder of this disclosure.

Referring to FIG. 1A, a configurable occluder 100A includes a first polarizer 102 for polarizing an impinging light beam 101 to obtain a first light beam 103 having a first polarization state, in this example a linear polarization along X-axis, i.e. in plane of FIG. 1A. An array of polarization rotators 104 is disposed downstream of the first polarizer 102 in an optical path of the first light beam 103. The array of polarization rotators 104 receives the first light beam 103 and changes, e.g. rotates, polarization of the first light beam 103 in a spatially selective manner from the first polarization state, e.g. the linear X-polarization state, to a second polarization state, e.g. a linear Y-polarization state orthogonal to the X-polarization state, to obtain a second light beam 105. In this example, dark-shaded polarization rotators 121 of the array of polarization rotators 104 do not rotate the polarization, and light-shaded polarization rotators 122 of the array of polarization rotators 104 rotate the polarization from linear X-polarization to linear Y-polarization. As a result of the spatially selective polarization rotation of the first light beam 103 by the array of polarization rotators 104, a first portion 111 of the second light beam 105 is linearly polarized along X-axis, and a second portion 112 of the second light beam 105 becomes linearly polarized along Y-axis.

A polarization-selective scatterer 106 is disposed downstream of the array of polarization rotators 104 in an optical path of the second light beam 105. The polarization-selective scatterer 106 receives the second light beam 105 and scatters the first portion 111 of the second light beam 105 having the first polarization state (i.e. polarized along X-axis in this case) while transmitting the second portion 112 of the second light beam 105 having the second polarization state (i.e. polarized along Y-axis) substantially without any scattering.

A second polarizer 108 is disposed downstream of the polarization-selective scatterer 106. In this example, the second polarizer 108 is a linear transmission polarizer oriented to transmit the second portion 112 of the second light beam 105, while absorbing the first portion 111 scattered by the polarization-selective scatterer 106 as shown by arrows 113. The scattering provided by the polarization-selective scatterer 106 enhances the light extinction provided by the second polarizer 108. The scattering removes fine details and averages out bright areas of the image carried by the first portion 111 of the second light beam 105 having the first polarization state.

Figure 1B:
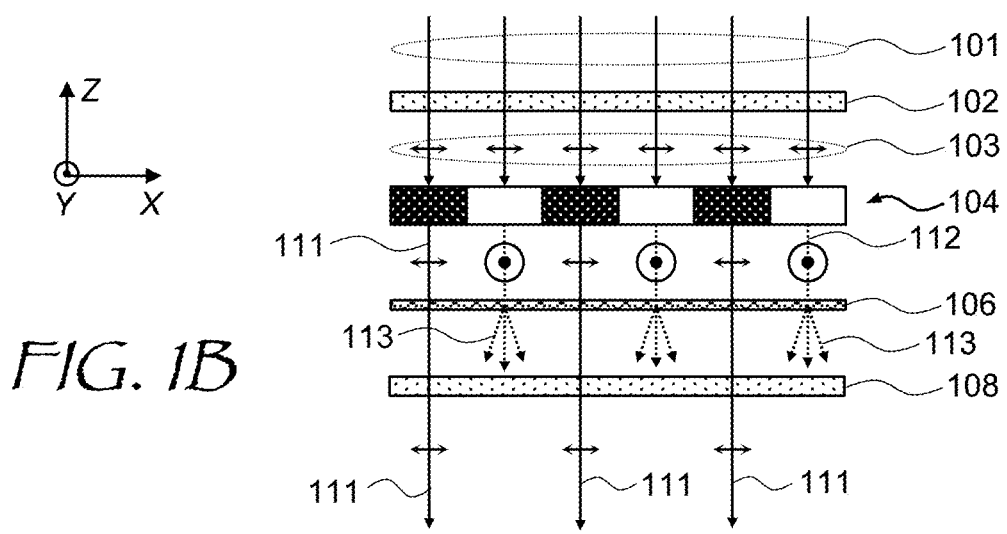
FIG. 1B is a schematic cross-sectional view of a variant of the configurable occluder of FIG. 1A.

Referring to FIG. 1B, a configurable occluder 100B is similar to the configurable occluder 100A of FIG. 1A. In the configurable occluder 100B of FIG. 1B, the polarization-selective scatterer 106 and the second polarizer 108 are rotated about Z-axis by 90 degrees as compared to the configurable occluder 100A of FIG. 1A.

In operation, the array of polarization rotators 104 (FIG. 1B) receives the first light beam 103 and rotates polarization of the first light beam 103 in a spatially selective manner from linear X-polarization state, to linear Y-polarization state. The dark-shaded polarization rotators 121 of the array of polarization rotators 104 do not rotate the polarization, and the light-shaded polarization rotators 122 of the array of polarization rotators 104 rotate the polarization. The first portion 111 of the second light beam 105 is linearly polarized along X-axis, and the second portion 112 of the second light beam 105 becomes linearly polarized along Y-axis. So far, the operation has been similar to that of the configurable occluder 100A of FIG. 1A.

As noted above, in the configurable occluder 100B of FIG. 1B, the polarization-selective scatterer 106 is rotated about Z-axis by 90 degrees as compared to the configurable occluder 100A of FIG. 1A. Due to its orientation, the polarization-selective scatterer 106 (FIG. 1B) receives the second light beam 105 and scatters the second portion 112 of the second light beam 105 polarized along Y-axis, while transmitting the first portion 111 of the second light beam 105 polarized along X-axis, substantially without any scattering.

Still referring to FIG. 1B, the second polarizer 108 disposed downstream of the polarization-selective scatterer 106 is oriented to transmit the first portion 111 of the second light beam 105, while absorbing the second portion 112 scattered by the polarization-selective scatterer 106 as shown by arrows 113. The scattering provided by the polarization-selective scatterer 106 enhances the light extinction provided by the second polarizer 108, achieving the same or similar function as the configurable occluder 100A of FIG. 1A. More generally, the polarization-selective scatterer 106 receives the second light beam 105 and scatters a portion of the second light beam 105 having one of the first or second polarization states, while transmitting a portion of the second light beam having the other one of the first or second polarization states. The second polarizer 108 transmits the non-scattered portion of the second light beam 105. The configurations of FIGS. 1A and 1B provide clear and opaque states of the configurable occluders 100A and 100B, respectively. By adding a black dye to the LC solution, one may obtain a dark state instead of an opaque state. Adding the black dye also enables one to lessen a contrast loss in the bright (non-scattered) state of the configurable occluder 100A of FIG. 1A and 100B of FIG. 1B.

The array of polarization rotators 104 may be implemented using liquid crystals. A liquid crystal (LC) cell with a pixelated transparent driving electrode may include a thin layer of a liquid crystal material in a suitable configuration, e.g. a pi-cell, twisted nematic (TN), super-twisted nematic (STN), film-compensated STN (FSTN), fringe-field switching (FFS), in-plane switching (IPS), etc. High performance may be achieved when the retardation of the LC layer is half-wave retardation. The transparent electrode(s) of the LC cell may be made e.g. of indium tin oxide (ITO). Herein and throughout the rest of the specification, the term "transparent" is to be understood as transmitting a substantial portion of impinging light. For example, the term "transparent" may include materials that are somewhat absorptive or reflective, materials that appear translucent, etc.

Figure 2A:
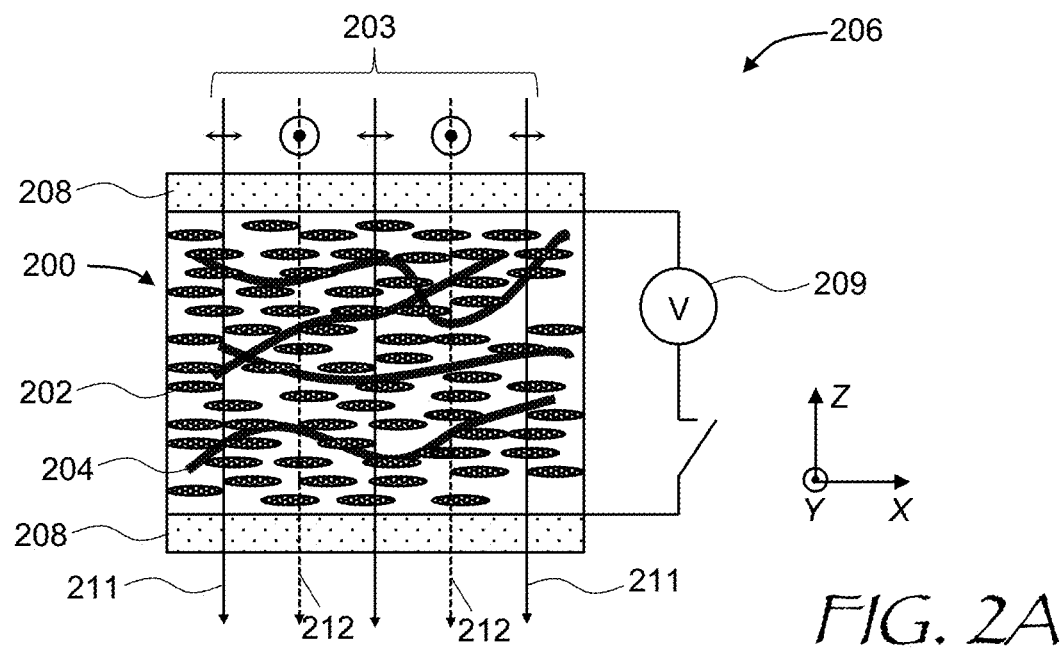
FIG. 2A is a schematic cross-sectional view of a polarization-selective scatterer embodiment based on a liquid crystal (LC)-based polarization selective diffuser (PSD) in an OFF state.
Figure 2B:
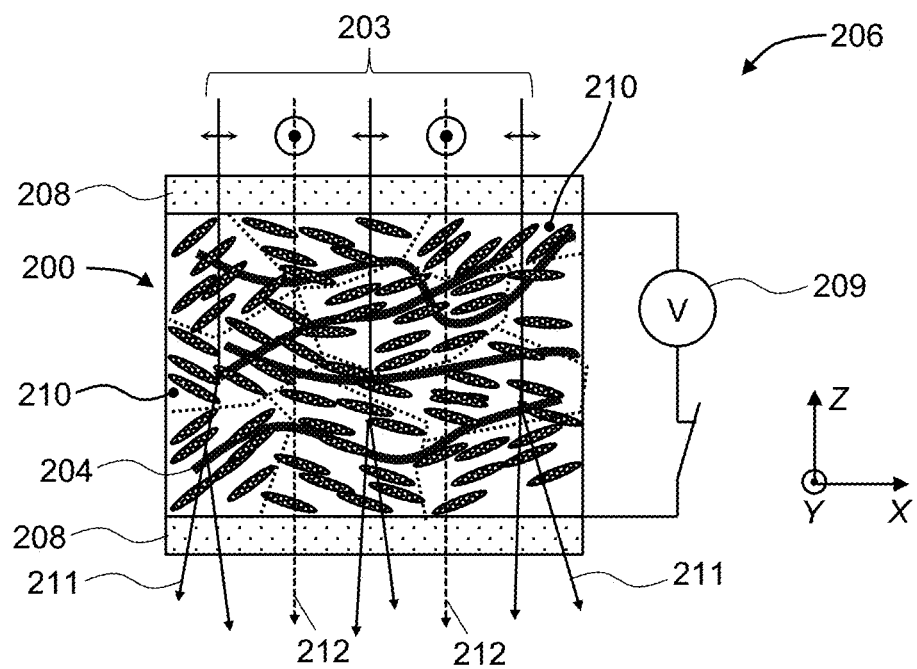
FIG. 2B is a schematic cross-sectional view of the PSD of FIG. 2A in an ON state.

Embodiments of the polarization-selective scatterer 106 will now be considered. Referring to FIGS. 2A and 2B, a liquid crystal (LC)-based polarization-selective diffuser (PSD) device 206 includes a cell 200 enclosing a layer 202 of nematic LC molecules dispersed in a polymer network 204 shown with thick black lines. The LC molecules may have positive dielectric anisotropy. The cell 200 includes a pair of transparent top and bottom electrodes 208 for applying a voltage across the LC layer 202. The polymer network 204 extends generally in X-direction, and the LC molecules are homogeneously aligned by the polymer network 204 in the X-direction when voltage 209 is not applied (FIG. 2A). Thus, the LC layer is stabilized by the polymer network 204. When a Y-polarized portion 212 of the light beam 203 impinges onto the cell 200 (the Y-polarized portion 212 is shown with dashed lines), no scattering occurs because Y-polarized light only encounters ordinary refractive index of the LC layer 202. The X-polarized portion 211 (shown with solid lines) is not scattered either, because the X-polarized portion encounters a uniform extraordinary refractive index of the LC layer 202.

The application of the voltage 209 (FIG. 2B) creates an electrostatic torque tending to orient the LC molecules vertically, i.e. in Z-direction, while the polymer network 204 provides an elastic force tending to keep the LC in the X-direction. As a result of competition between the applied electric field and the elastic resistance of the polymer network 204, the LC layer 202 is switched into a multi-domain structure including a plurality of conterminous domains 210. The domains 210 are outlined with dotted-line boundaries. The LC molecules are oriented along the same direction within each domain 210, but the orientations vary from domain 210 to domain 210. The orientations, or directions of the domains 210 are random in the XZ plane. The X-polarized portion 211 of the light beam 203 impinging onto the cell 200 encounters different refractive indices in different domains 210 and is therefore scattered. The Y-polarized portion 212 of the light beam 203 impinging onto the cell 200 always encounters the ordinary refractive index of the LC molecules because the LC molecules are oriented in the XZ plane, enabling the Y-polarized portion 212 to pass through the cell 200 without scattering. Thus, the electrodes 208 enable electric control of the amount of scattering of the X-polarized portion 211 of the light beam 203 by the polymer-stabilized LC layer 202.

Many variants of PSDs are possible. To fabricate an active PSD as depicted in FIGS. 2A and 2B, the LC fluid—monomer mixture may be polymerized in presence of a pre-defined voltage Vp, and at a wavelength and dosage of polymerizing light, typically ultraviolet (UV) light, for a pre-defined time. The manufactured configurable occluder will be clear without voltage, and opaque under applied voltage, as shown in FIGS. 2A and 2B.

A passive version of PSD may also be fabricated, as follows. First, the LC fluid and monomer mixture is exposed to polymerizing light at pre-defined wavelength and dosage for a short time. At this step, no voltage is applied to the cell 200. The LC and monomer molecules that are randomly oriented are photo polymerized. Next, a voltage is applied to the cell 200 without any other change, i.e. when cell 200 is still under exposure with same wavelength and dosage as of the first step. After applying voltage, some LC molecules that have lower anchoring will be oriented along the electric field (assuming that the LC material has a positive dielectric anisotropy) and polymerized in that orientation. Therefore the final cell 200 will look opaque. When such cell 200 is used with a polarizer, then for one polarization, the light passes through, while for the orthogonal polarization, the light will be blocked, as shown in FIG. 2B, except no application of voltage to the cell 200 is required to achieve the polarization-selective attenuation/scattering function.

In this and other configurations, the liquid crystal molecules are oriented to have a uniform refractive index for X-polarized portion of the impinging light beam, and a different, spatially varying refractive index for Y-polarized portion of the impinging light beam, for scattering the Y-polarized portion. It is further noted that the terms "X-polarized portion" and "Y-polarized portion" are relative terms used for convenience, and the performance of a PSD may be reversed upon rotation of the PSD by 90 degrees about Z-axis.

Figure 2C:
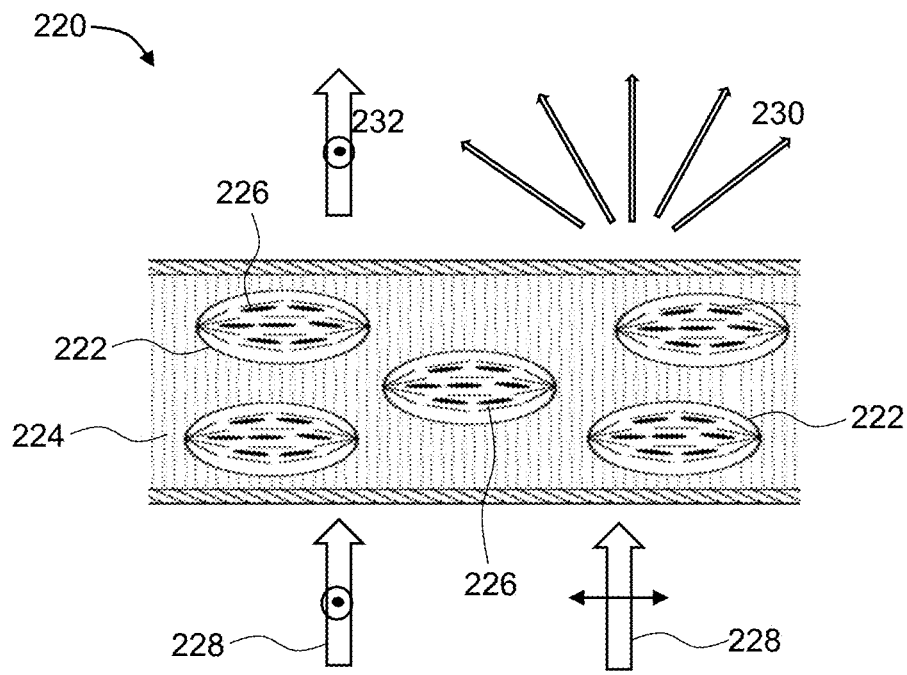
FIG. 2C is a schematic cross-sectional view of a polarization-selective scatterer embodiment based on polymer-dispersed LC (PDLC) droplets.

Referring to FIG. 2C, a PSD may be fabricated by providing a polymer-dispersed LC (PDLC) structure 220, in which the LC material forms a plurality of droplets 222 in a polymer matrix 224 having a refractive index $n_P$ matched to an ordinary refractive index $n°_{LC}$ of the LC material. LC molecules 226 can be aligned by in-plane application of magnetic and/or electric field during phase separation between the LC fluid and the polymer, in which the LC droplets 222 are formed. In some embodiments, the LC molecules 226 can be aligned by stretching a PDLC film in one direction, e.g. in horizontal direction in FIG. 2C. In some embodiments, the alignment by the electric and/or magnetic field may be complemented by the alignment due to stretching the PDLC film. When external light 228 is polarized along the LC molecules 226 aligned in the droplets 222, there is an index mismatch between the extraordinary refractive index $n^e_{LC}$ with the refractive index $n_P$ of the surrounding polymer matrix 224, and as a result the light will be scattered, as illustrated schematically by arrows 230. When the external light 228 is polarized perpendicular to the aligned LC molecules 226, the refractive index is matched, so that no scattering occurs, as illustrated by a single arrow 232.

Referring back to FIGS. 1A and 1B, the polarization-selective scatterer 106 may include a polymer-dispersed liquid crystal layer with liquid crystal droplets dispersed in the polymer network. The mechanical stretching of the layer and/or applying electric and/or magnetic fields causes liquid crystal molecules in the droplets to be aligned predominantly in a direction perpendicular to a plane of polarization of the second portion 112 of the second light beam 105. As a result, the liquid crystal molecules are oriented to have a uniform refractive index for the second portion 112 of the second light beam 105, and a different, spatially varying refractive index for the first portion 111 of the second light beam 105, causing scattering the first portion 111 of the second light beam 105.

In embodiments where the first and second polarization states are circular polarization states of opposite handedness, the polarization-selective scatterer 106 may include a polarization volume hologram including liquid crystal molecules in a periodic cholesteric configuration. The configuration may include a plurality of helical structures in an array form or pseud-randomly disposed helical structures. The liquid crystal molecules in these helical structures are oriented to have a uniform refractive index for circularly polarized light of a certain handedness, e.g. that of the second portion of the second light beam, and a different, spatially varying refractive index for the circularly polarized light of the opposite handedness, e.g. the first portion of the second light beam, for scattering the first portion of the second light beam.

Figure 3:
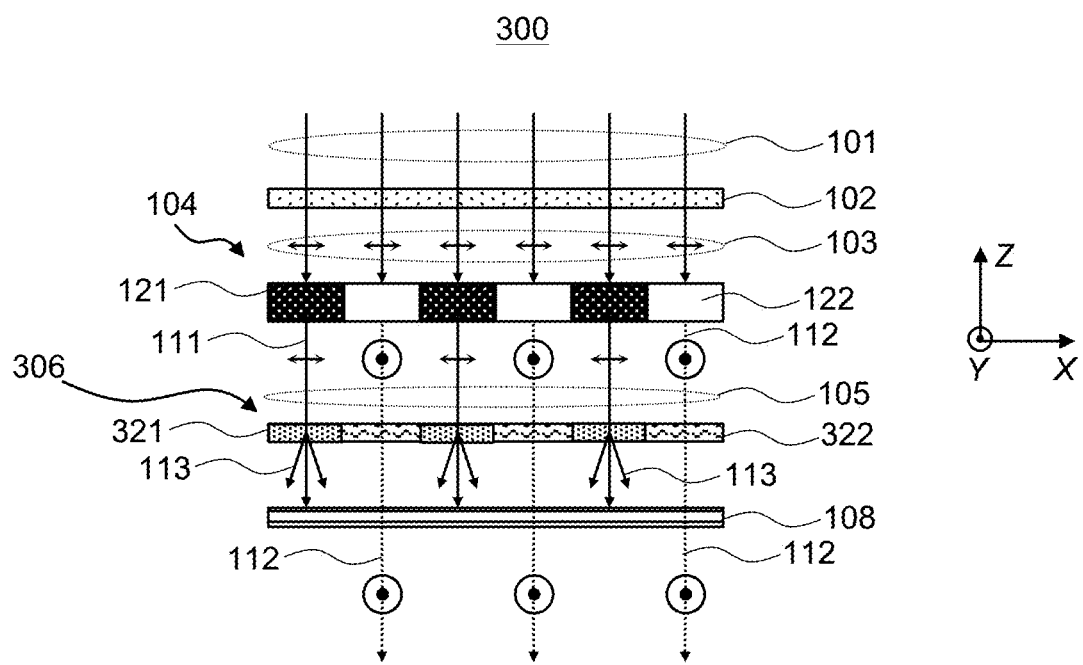
FIG. 3 is a schematic cross-sectional view of a configurable occluder embodiment including a pixelated PSD.

The polarization-selective scatterers described herein may be pixelated. By way of a non-limiting example, at least one of the transparent electrodes 208 of the PSD 206 (FIGS. 2A and 2B) may be pixelated, to provide spatially varying performance of the PSD. For example, referring to FIG. 3, a configurable occluder 300 is similar to the configurable occluder 100A of FIG. 1A. The configurable occluder 300 of FIG. 3 includes a pixelated PSD 306, which is similar to the PSD 206 of FIGS. 2A and 2B but has at least one of the transparent electrodes 208 pixelated, i.e. including an array of electrically insulated, individually addressable segments or pixels 321, 322 for applying the voltage to the LC layer 202 in a spatially-selective manner. As shown in FIG. 3, the pixels 321, 322 of the PSD 306 may be spatially registered with the polarization rotators 121, 122 of the array 104 of polarization rotators, such that first 111 and second 112 portions of the second light beam 105 propagate through the corresponding pixels 321, 322 of the PSD 306. The pixelated PSD 306 may enable a spatially-selective control of scattering of the first 111 and second 112 portions of the second light beam 105, thus facilitating a better control of scattering properties of the pixelated PSD 306. It is further noted that any of the pixelated PSDs 306, the polarization-selective scatterer 106, and the array of polarization rotators 104 may be operated in a binary mode, i.e. with two driving voltages providing two states with distinct polarization properties, and/or in a smoothly varying/grayscale mode providing states with smoothly varying polarization properties. In other words, any one of both of the PSD 206 of FIG. 2, the pixelated PSD 306 of FIG. 3, and the LC array (TN, STN, FSTN, FFS, IPS, etc.) used as the array of polarization rotators 104, may be operated in a binary or a grayscale mode.

Other types of polarization-selective scatterers may be used in configurable occluders. By way of a non-limiting example, referring to FIG. 4, a configurable occluder 400 includes the first linear polarizer 102 for polarizing the impinging light beam 101 to obtain the first light beam 103 having the first polarization state, in this example the linear polarization oriented along X-axis, i.e. in plane of FIG. 4. The array of polarization rotators 104 is disposed downstream of the first polarizer 102 in an optical path of the first light beam 103. The array of polarization rotators 104 receives the first light beam 103 and rotates polarization of the first light beam 103 in a spatially selective manner from the first polarization state, i.e. the linear X-polarization state, to a second polarization state, i.e. the linear Y-polarization state orthogonal to the X-polarization state, to obtain a second light beam 105. The dark-shaded polarization rotators 121 of the array of polarization rotators 104 do not rotate the polarization, and light-shaded polarization rotators 122 of the array of polarization rotators 104 rotate the polarization from linear X-polarization to linear Y-polarization. As a result of the spatially selective polarization rotation of the first light beam 103 by the array of polarization rotators 104, a first portion 111 of the second light beam 105 is linearly polarized along X-axis, and a second portion 112 of the second light beam 105 becomes linearly polarized along Y-axis. A first quarter-wave waveplate (QWP) 431 is disposed downstream of the array of polarization rotators 104 in an optical path of the second light beam 105. The first QWP 431 converts the first (X-polarized) portion 111 of the second light beam 105 into a right hand (RH) polarized beam portion 441, and the second (Y-polarized) portion of the second light beam 105 into a left hand (LH) polarized beam portion 442.

A Pancharatnam-Berry Polarization-Selective Diffuser (PB-PSD) 406 is disposed downstream of the array of polarization rotators 104 in an optical path of the second light beam 105. The PB-PSD 406 receives the RH polarized portion 441 and the LH polarized portion 442 and scatters the RH polarized portion 441 while changing its polarization to LH (a scattered portion 413). The LH polarized portion 442 propagates without scattering, but changes its polarization from LH to RH (a propagated portion 412). A second QWP 432 changes the scattered portion's 413 polarization to X-linear polarization, and the propagated portion's 412 polarization to Y-linear polarization. A second linear polarizer 415 transmits only the propagated portion 412. A right-hand circular polarizer (RCP) 433, shown in dashed lines, may be used instead of the QWP 431 and linear polarizer 415. The PB-PSD 406 is sensitive to circular polarization as opposed to the PSD 106 or 306, which are sensitive to linear polarization. The benefit of the PB-PSD 406 is an improved efficiency and see-through quality, i.e. low haze.

A fabrication process of the PB-PSD 406 may include steps of photoalignment and photopolymerization of a reactive mesogen (i.e. an LC material). The photoalignment step includes recording a randomly oriented profile (diffuser profile) on the photoalignment material. By way of a non-limiting example, this may be achieved by interfering two light beams with orthogonal circular polarization states having a same optical power density and optical path length. In order to create the PB-PSD 406, a template diffuser can be placed in one of the arms of the two-beam interferometer. Another way is to use direct writing a random profile. In this type of diffuser, the azimuthal angle of photoalignment material is continually increases; and the Pancharatnam-Berry phase, which is twice of the azimuthal angle, also increases continually. Since a diffuser template was used in one of the interferometer arms, the azimuthal angle of photoalignment material changes randomly. PB-PSDs operate based on phase rather than intensity. As a result, the optical haze is much lower and the efficiency of conversion is much higher than with a regular PSD operating with linear polarization.

In the photopolymerization step, the reactive mesogen is coated on the substrates and cured to fix the alignment in place. The reactive mesogen can be optimized further using chiral dopant to have twist in direction perpendicular to the surface. This twist structure creates a periodically slanted refractive index planes which causes the diffuser to act as a Bragg diffuser and have high efficiency. If the twist in Z direction is large enough the Bragg condition can be achieved for 0-degree incident light. If the twist is not enough to obtain Bragg condition at 0 degree incidence angle, it can still enhance the diffuser efficiency across visible wavelengths of light.

Figure 4:
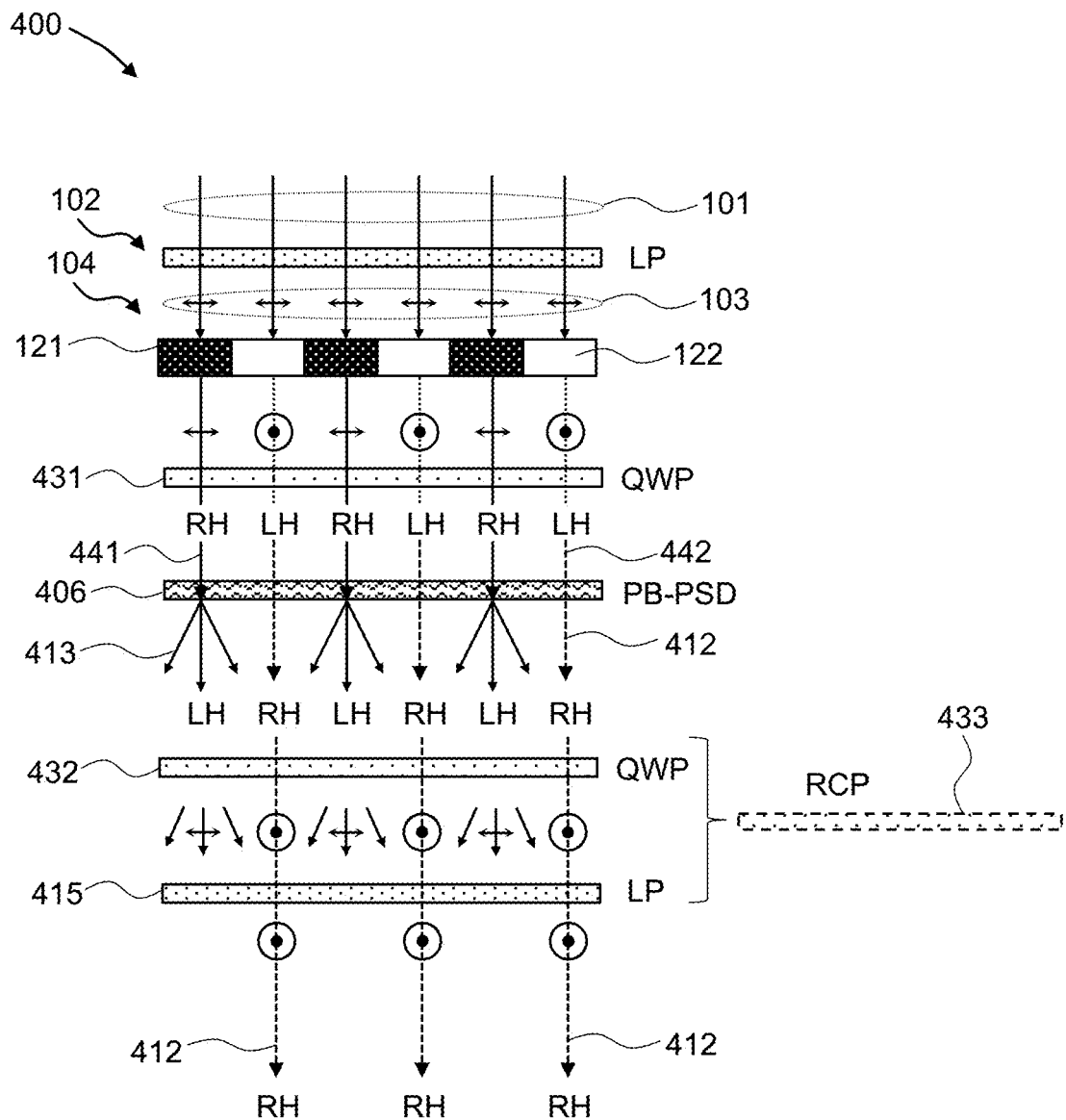
FIG. 4 is a partial cross-sectional view of a configurable occluder using a Pancharatnam-Berry polarization-selective diffuser (PB-PSD) as a polarization-selective scatterer.
Figure 5:
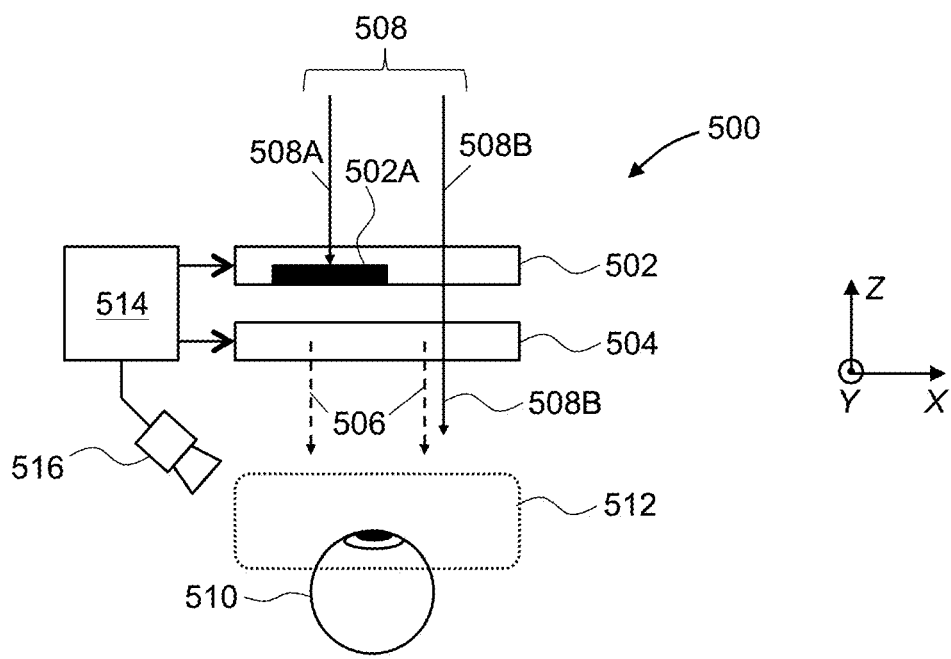
FIG. 5 is a schematic cross-sectional view of a near-eye display including a configurable occluder.

Referring to FIG. 5, a see-through near-eye display device 500 includes a configurable occluder 502, for example and without limitation, the configurable occluder 100A of FIG. 1A, the configurable occluder 100B of FIG. 1B, the configurable occluder 300 of FIG. 3, or the configurable occluder 400 of FIG. 4. The configurable occluder 502 functions to selectively attenuate or block portion(s) 508A of external light 508, while propagating other portion(s) 508B of the external light 508 through the configurable occluder 502.

The see-through near-eye display device 500 further includes a see-through display module 504 disposed downstream of the configurable occluder 502, for providing display light 506 conveying an image in angular domain for direct observation by a user, and for transmitting the external light portion 508B propagated through the configurable occluder 502. An eye 510 of the user disposed in an eyebox 512 can observe the outside environment through the see-through near-eye display device 500 by receiving the propagated external light portion(s) 508B, and also observe the display-generated image carried by the display light 506, simultaneously or in a time-sequential manner. Herein, the term "eyebox" refers to a geometrical area where the display-generated image of acceptable image quality may be observed.

To improve the see-through function, the external light 508 and the display light 506 may be orthogonally polarized. For example, the light beam portion 112 propagated through the configurable occluder 100A of FIG. 1A is linearly polarized along Y-axis. The see-through display module 504 may be made transparent for Y-polarized light, while providing the display light linearly polarized along X-axis.

The see-through near-eye display device 500 may further include a controller 514 operably coupled to the see-through display module 504 and the configurable occluder 502, e.g. to the array of polarization rotators 104 of the configurable occluder 100A of FIG. 1A. The controller 514 may be configured to obtain an image to be displayed to the user. The image may include a virtual object to occlude a corresponding portion of outside environment observed by the user, for added reality and/or for a better visual contrast of the object. More generally, the image to be displayed may include a region intended to dim or occlude the corresponding portion of outside environment. To achieve the occlusion effect, the controller 514 may operate the occluder 502, i.e. the array of polarization rotators 104 (FIGS. 1A and 1B) to dim the corresponding portion of the outside environment by reducing the transparency of the configurable occluder 502 in an occlusion area 502A of the configurable occluder 502. The controller may operate the see-through display module 504 to provide the display light 506 carrying the image to be displayed, simultaneously or in a time-sequential manner.

In some embodiments, the through near-eye display device 500 further includes an eye tracker 516 for determining, in real time, at least one of position or orientation of the user's eye 510 in the eyebox 512. The controller 514 may be configured to use the eye tracker 516 to determine the at least one of the eye position or orientation of the user's eye 510 in the eyebox 512 with the purpose of determining parallax of the occluding region in accordance with the determined eye position and/or orientation, and to adjust size and/or position of the occluding region, to account for the parallax of the occluding region. The dependence of the size and position of the occluding region on the eye position and orientation will be considered further below.

Figure 6:
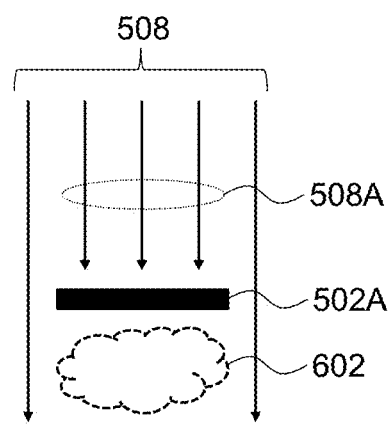
FIG. 6 is a schematic diagram illustrating a principle of occlusion of a portion of a real-world environment to make a virtual object more noticeable.

Occlusion of a portion of a real-world environment is illustrated in FIG. 6. A virtual object 602 is displayed by the see-through near-eye display device 500 to a user. An area of the virtual object 602, i.e. a projection of the virtual object 602 on the outside world as seen by the user, is to occlude the portion 508A of the external light 508. To that end, the transparency, i.e. the optical throughput of the occlusion area 502A of the configurable occluder 502 is reduced, making the virtual object 602 appear to block a portion of the outside environment represented by the portion 508A of the external light 508. This improves the fidelity of the virtual object 602, making it appear immersed into the outside world environment.

The principles of configuring the occlusion area 502A of the configurable occluder 502 depending on the size and shape of the occluding area (e.g. occluding virtual object) and the viewer's eye pupil position will now be explained using several illustrative examples. Referring first to FIG. 7A, the see-through display device 504 provides an image of the virtual object 602 of a linear size D at a distance b from the pupil of the user's eye 510. Accordingly, the angular size α of the virtual object 602 may be determined from the equation $$\tan(\alpha/2) = D/2b \tag{1}$$

The occluder 502 is disposed at a distance a from the pupil of the user's eye 510. Note that the distance a may be determined by an eye tracker in real time. The linear size d of the occlusion area 502A of the configurable occluder 502 may be found as $$d = (a/b)D \tag{2a}$$

or, for on-axis objects, $$d = 2a \tan(\alpha/2) \tag{2b}$$

The shape of the occlusion area 502A may repeat the shape of the virtual object 602. Smoothing or feathering of the boundary of the occlusion area 502A may be provided for the occluding virtual object 602 to look naturally immersed into the real-world environment as viewed by the user.

The lateral location of the occluding area 502A in the configurable occluder 502 may be determined as illustrated in FIG. 7B. For simplicity, the virtual object 602 is located at a straight angle to the see-through display device 504, that is, in a direction straight ahead in front of the viewer. First, a case is considered where the virtual object 602 displayed by the see-through display device 504 is located at infinity, as indicated with an asterisk (*). In this configuration, the coordinates (x,y) of the occluding area 502A are equal to the coordinates (X',Y') of the user's eye 510, which may be obtained by using an eye tracker.

In a case where the virtual object 602 is located at a finite distance c from the user's eye 510 at a straight angle to the see-through display device 504, the coordinates (x,y) of the occluding area 502A may be adjusted for parallax in the following manner:

$$(x,y) = (X,Y) - (a/c)(X'-X, Y'-Y) \tag{3}$$

Figure 7C:
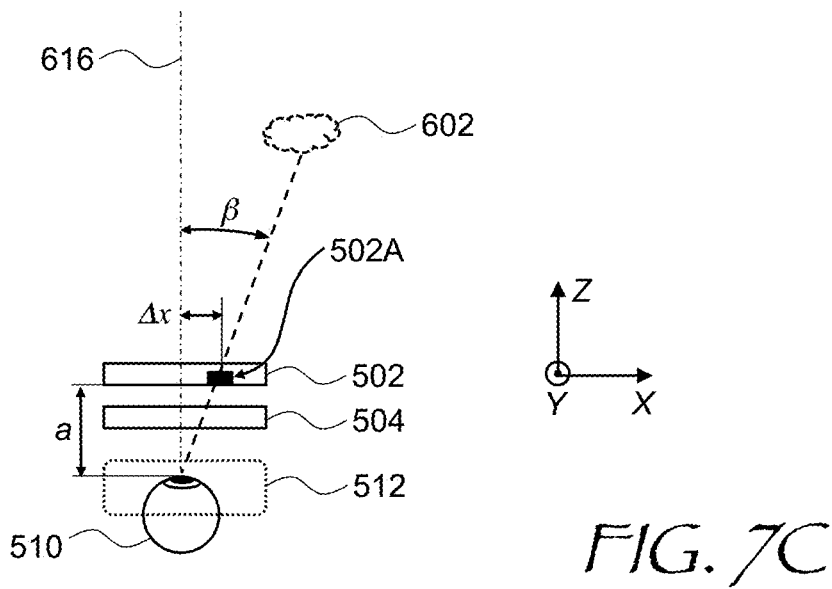
FIG. 7C is a schematic cross-sectional view of a near-eye display illustrating the principle of selecting a position of an occluding area of the configurable occluder based on angular position of the occluding region in the image.

Virtual objects offset from a center of the field of view of the see-through display device 504 will also experience parallax due to the configurable occluder 502 being disposed at a finite distance from the user's eye 510. Referring to FIG. 7C for example, the virtual object 602 representing the occluding region of the virtual image being displayed is disposed at an angle β in XZ plane with respect to a viewing normal 616. From the geometry of the display configuration, one obtains a shift Δx of the x-coordinate of the occluding area 502A as follows:

$$\Delta x = a \tan \beta \tag{4}$$

The y-coordinate of the occluding area 502A is determined similarly, by considering a corresponding viewing angle in YZ plane. Together, Eqs. (1) through (4) enable one to determine size and position of the occluding area 502A in the configurable occluder 502 while accounting for parallax effects. The controller 514 of the see-through near-eye display device 500 (FIG. 5) may be suitably configured to adjust the size and position of the occluding area 502A in accordance with Eqs. (1) to (4). The required eye pupil position in (X, Y Z') may be determined using the eye tracker 516 operably coupled to the controller 514.

Figure 8:
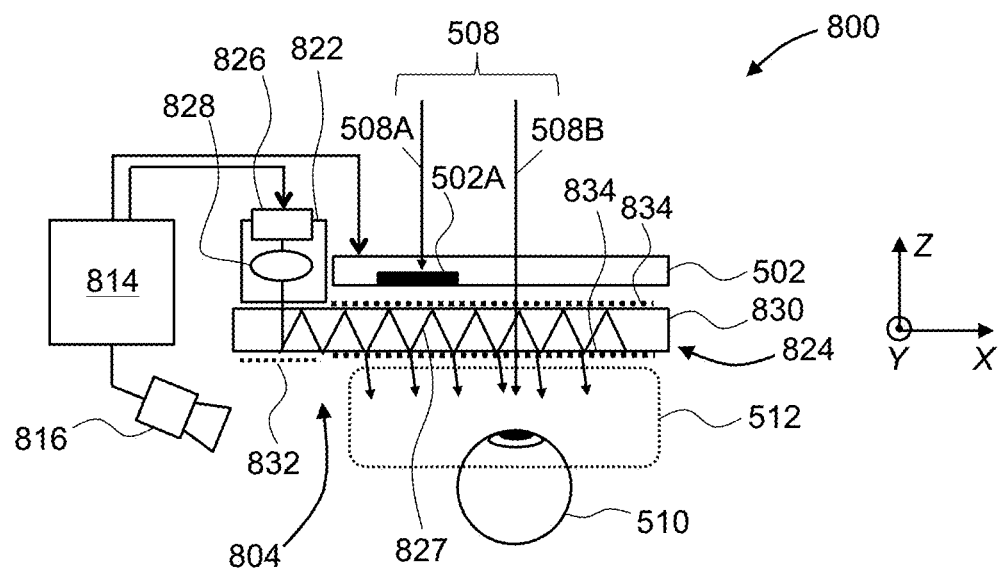
FIG. 8 is a schematic cross-sectional view of a near-eye display including a configurable occluder and a pupil-replicating waveguide.

Referring now to FIG. 8, a see-through near-eye display 800 is an embodiment of the see-through near-eye display 500 of FIG. 5. The see-through near-eye display 800 of FIG. 8 includes the configurable occluder 502, e.g. the configurable occluder 100A of FIG. 1A, 100B of FIG. 1B, the configurable occluder of FIG. 3, and/or the configurable occluder 400 of FIG. 4, and a waveguide-based display module 804. The waveguide-based display module 804 includes an image projector 822 optically coupled to a pupil-replicating waveguide 824. In the embodiment shown, the image projector 822 includes a display panel 826 providing display light 827 to a collimator 828. The collimator 828 collimates the display light 827 provided by the display panel 826, thus providing an image in angular domain.

The pupil-replicating waveguide 824 includes a slab of transparent material 830, an input grating 832, and (in this embodiment) a pair of output gratings 834. The pupil-replicating waveguide 824 receives the display light 827 at the input grating 832, which launches the display light 827 to propagate inside the slab 830 by total internal reflection (TIR). The output gratings 834 expand the display light 827 over the eyebox 512.

The see-through near-eye display 800 may further include a controller 814 operably coupled to an eye tracker 816. The controller 814 may be operably coupled to the display panel 822 for providing the display light 827. The controller 814 obtains eye pupil position from the eye tracker 816 and operates the configurable occluder 502 to "immerse" the displayed virtual objects into the outside world environment, as required. Size(s) and position(s) of the occluding area(s) may be determined as explained above.

Figure 9A:
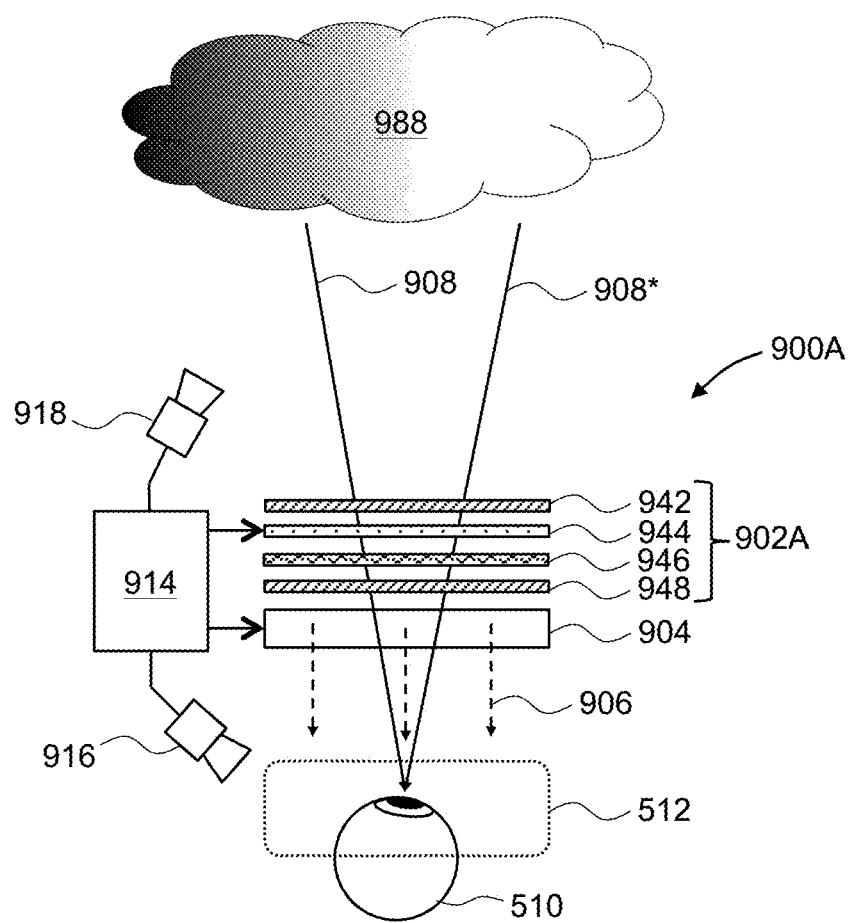
FIG. 9A is a schematic cross-sectional view of a near-eye display including a tunable dimmer.

Turning to FIG. 9A, a see-through near-eye display device 900A includes a tunable dimmer 902A and a see-through display module 904 disposed downstream of the tunable dimmer 902A. In operation, the see-through display module 904 provides display light 906 conveying an image in angular domain to the eyebox 512, while transmitting outside light 908, 908* from outside environment 988, propagated through the tunable dimmer 902A. The see-through display module 904 may be based e.g. on a pupil-replicating waveguide, similarly to the see-through near-eye display 800 of FIG. 8.

The tunable dimmer 902A is constructed similarly to the configurable occluder 100A of FIG. 1A, 100B of FIG. 1B, 300 of FIG. 3, and/or 502 of FIG. 5, and operates in a similar manner. Specifically, the tunable dimmer 902A may include a first polarizer 942 for polarizing the outside light 908, 908*, to obtain a first light beam having a first polarization state. A tunable polarization rotator 944 is disposed downstream of the first polarizer 942. The tunable polarization rotator 944 receives the first light beam and rotates polarization of the first light beam by a controllable amount, to obtain a second light beam. A polarization-selective scatterer 946 is disposed downstream of tunable polarization rotator 944. In operation, the polarization-selective scatterer 946 receives the second light beam and scatters a first portion of the second light beam having one of the first or second polarization states, while transmitting a second portion of the second light beam having the other one of the first or second polarization states. The polarization-selective scatterer 946 may be constructed similarly to the PSD 206 of FIGS. 2A and 2B, or may include a PVH, for example. A second polarizer 948 is disposed downstream of the polarization-selective scatterer 946, for blocking the scattered light and transmitting the second portion of the second light beam.

The see-through near-eye display device 900A may further include an eye tracker 916 for determining at least one of position or orientation of the user's eye 510 in the eyebox 512. An outward-facing camera 918 may be provided for determining brightness of the outside environment 988 in an angular-selective manner. For example, the outward-facing camera 918 may determine that a left portion of the outside environment 988 is comparatively dim, providing a low-intensity left light beam 908, while a right portion of the outside environment 988 is comparatively bright, providing a high-intensity left light beam 908*. The see-through near-eye display device 900A may further include a controller 914 operably coupled to the see-through display module 904, the tunable polarization rotator 944 of the tunable dimmer 902A, the outward-facing camera 918, and the eye tracker 916. The controller 914 may be configured to use the eye tracker 916 to determine a gaze direction of the user's eye 510, use the outward-facing camera 918 to determine a brightness level of the outside environment in the gaze direction as determined by the eye tracker 916, and operate the tunable polarization rotator 944 of the tunable dimmer 902A to dim the outside environment 988 in accordance with the brightness of the outside environment 988 in the determined gaze direction of the user's eye 510. For example, if the user's eye 510 gazes in the direction of the low-intensity left light beam 908, the amount of applied dimming may be comparatively small, or no dimming may be applied at all. If, however, the user's eye 510 gazes in the direction of the high-intensity right light beam 908*, the amount of applied dimming may be increased. This may be useful in reducing or preventing the contrast loss of the image being displayed to the user by the see-through display module 904. If the dimming of the outside environment 988 is not applied, the high-intensity right light beam 908* from the bright portion of the outside environment 988 may overwhelm the image displayed to the user.

Figure 9B:
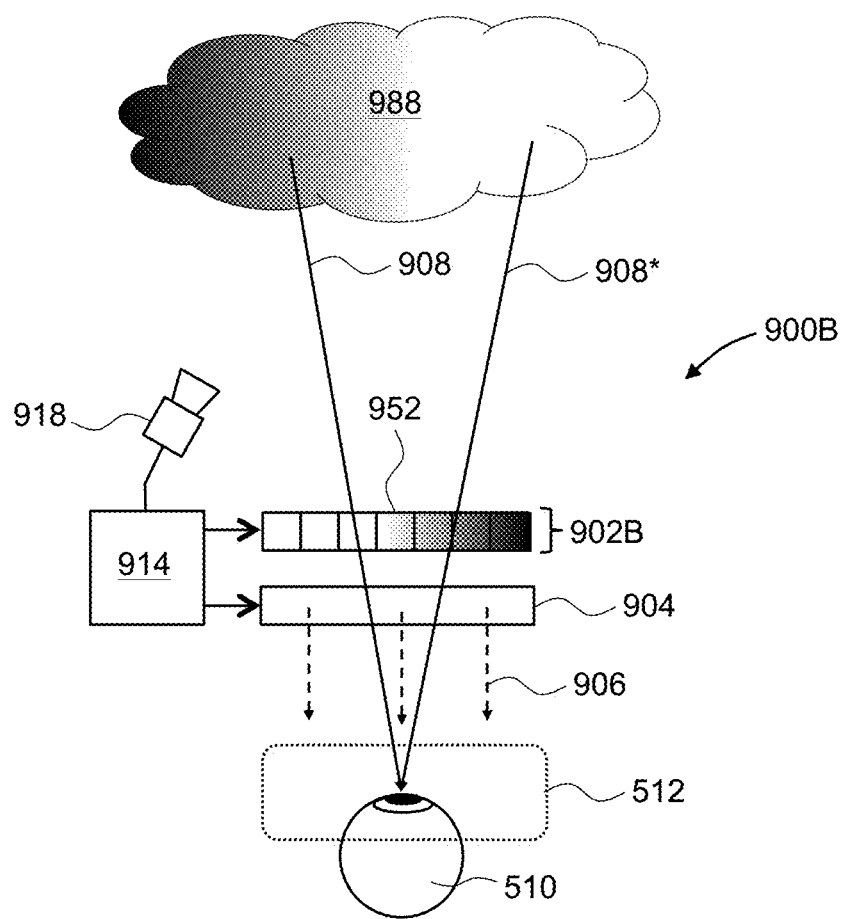
FIG. 9B is a schematic cross-sectional view of a near-eye display including a configurable pixelated dimmer/occluder.

Referring now to FIG. 9B, a see-through near-eye display device 900B is similar to the see-through near-eye display device 900A of FIG. 9A, with one difference being that the tunable polarization rotator 944 is pixelated, i.e. includes an array of individually controllable polarization rotator elements, for spatially varying a polarization state of the second light beam to dim the outside environment in a spatially-variant manner. A pixelated dimmer 902B is shown schematically in FIG. 9B as including an array of dimmer elements 952.

The see-through near-eye display device 900B of FIG. 9B includes the outward-facing camera 918 for determining brightness of the outside environment 988 in an angular-selective manner. For example, the outward-facing camera 918 may determine that the left portion of the outside environment 988 is comparatively dim, providing the low-intensity left light beam 908, while the right portion of the outside environment 988 is comparatively bright, providing the high-intensity left light beam 908*. The see-through near-eye display device 900A further includes the controller 914 operably coupled to the see-through display module 904, the array of individually controllable polarization rotator elements of the pixelated dimmer 902B, and the outward-facing camera 918. An eye tracker (not shown) may also be provided. The controller 914 may be configured to use the outward-facing camera 918 to determine the angular distribution of brightness of the outside environment 988.

The controller 914 may then operate the individual polarization rotators of the tunable dimmer to dim the outside environment in a spatially-variant manner in accordance with the angular distribution of brightness of the outside environment. For example, the amount of applied dimming may be comparatively small in the direction of the low-intensity left light beam 908, or no dimming may be applied at all. The amount of applied dimming in the direction of the high-intensity right light beam 908* may be high, as shown schematically with different grades of shading of individual dimmer elements 952 od the pixelated dimmer 902B. This may be useful in reducing or preventing the contrast loss of the image being displayed to the user by the see-through display module 904. If the spatially-selective dimming of the outside environment 988 were not applied, the high-intensity right light beam 908* from a bright portion of the outside environment 988 would overwhelm the image displayed to the user. This enables the perceived contrast of the displayed image to be preserved across the entire image, regardless of the outside environment illumination levels. It is noted that, as the outside illumination levels may vary by many orders of magnitude, the additional attenuation, occlusion, and/or dimming provided by the polarization-selective scatterers disclosed herein may be highly beneficial in preserving the contrast of the displayed image and/or providing an adequate degree of occlusion of areas of outside environment overlapped by opaque virtual objects.

Figure 10:
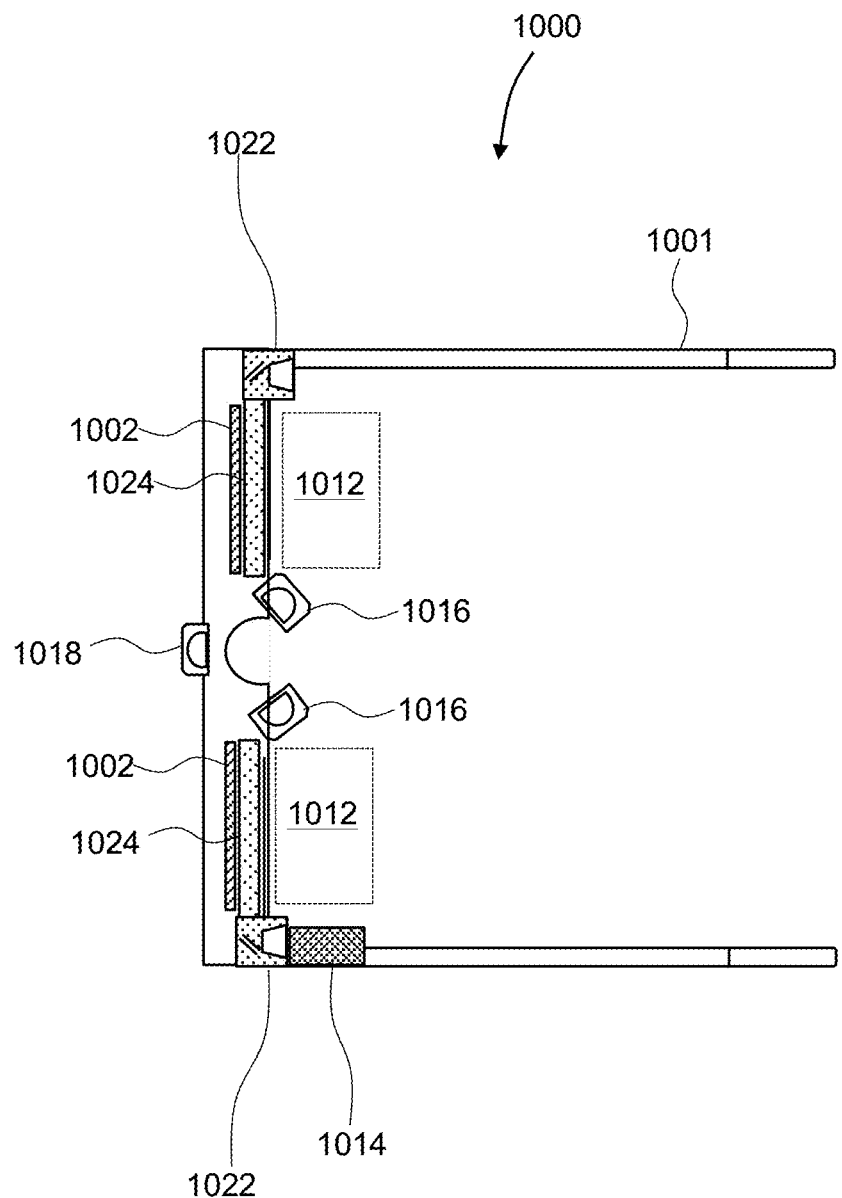
FIG. 10 is a top cross-sectional view of a near-eye display of this disclosure having a form factor of eyeglasses.

Turning to FIG. 10, a near-eye display 1000 includes a frame 1001 having a form factor of a pair of eyeglasses. The frame 1001 supports, for each eye: an image projector 1022, a pupil-replicating waveguide 1024, a configurable occluder/dimmer 1002, and an eye-tracking camera 1016. An outward-facing camera 1018 may be provided to determine angular brightness distribution of the outside world environment. A controller 1014 may be provided to operate the image projectors 1022 and the configurable occluders/dimmers 1002 based on the input from the eye trackers 1016 and/or the outward-facing camera 1018, as described above. The image projector 1022 may be based on a micro-display or a light engine coupled to a scanner, as described above with reference to FIG. 8. The light engine may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. The scanner may include a 2D microelectromechanical system (MEMS) scanner, for example.

The function of the pupil-replicating waveguide 1024 is to provide multiple laterally offset copies of the display light beams to cover the entire area of eyeboxes 1012. The eyeboxes 1012 denote geometrical areas for placing the user's eyes when a user wears the near-eye display 1000. When the user's eyes are located in the areas outlined by the eyeboxes 1012, an image of acceptable quality may be displayed to the user. The multiple laterally offset copies of the display light beams are provided by the pupil-replicating waveguides 1024 to ensure that the area of the eyeboxes 1012 is wide enough for convenient observation of the displayed imagery by different users.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
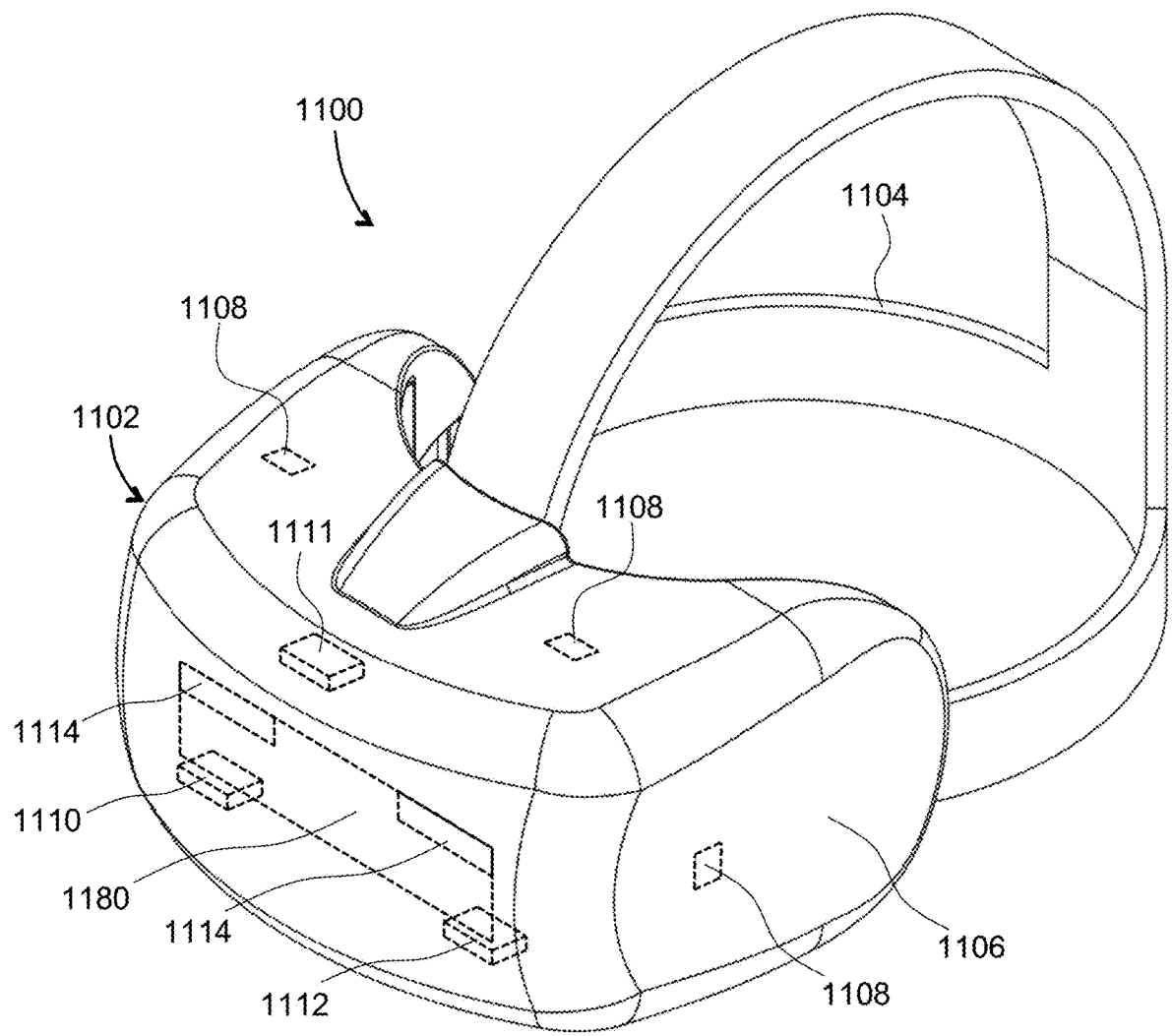
FIG. 11A is an isometric view of a head-mounted display of this disclosure.

Referring to FIG. 11A, an HMD 1100 is an example of an AR/VR wearable display system which encloses the user's face, for a greater degree of immersion into the AR/VR environment. The HMD 1100 is an embodiment of the see-through near-eye display 1000 of FIG. 10, and may include any of configurable occluders/dimmers disclosed herein. The function of the HMD 1100 is to augment views of a physical, real-world environment with computer-generated imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
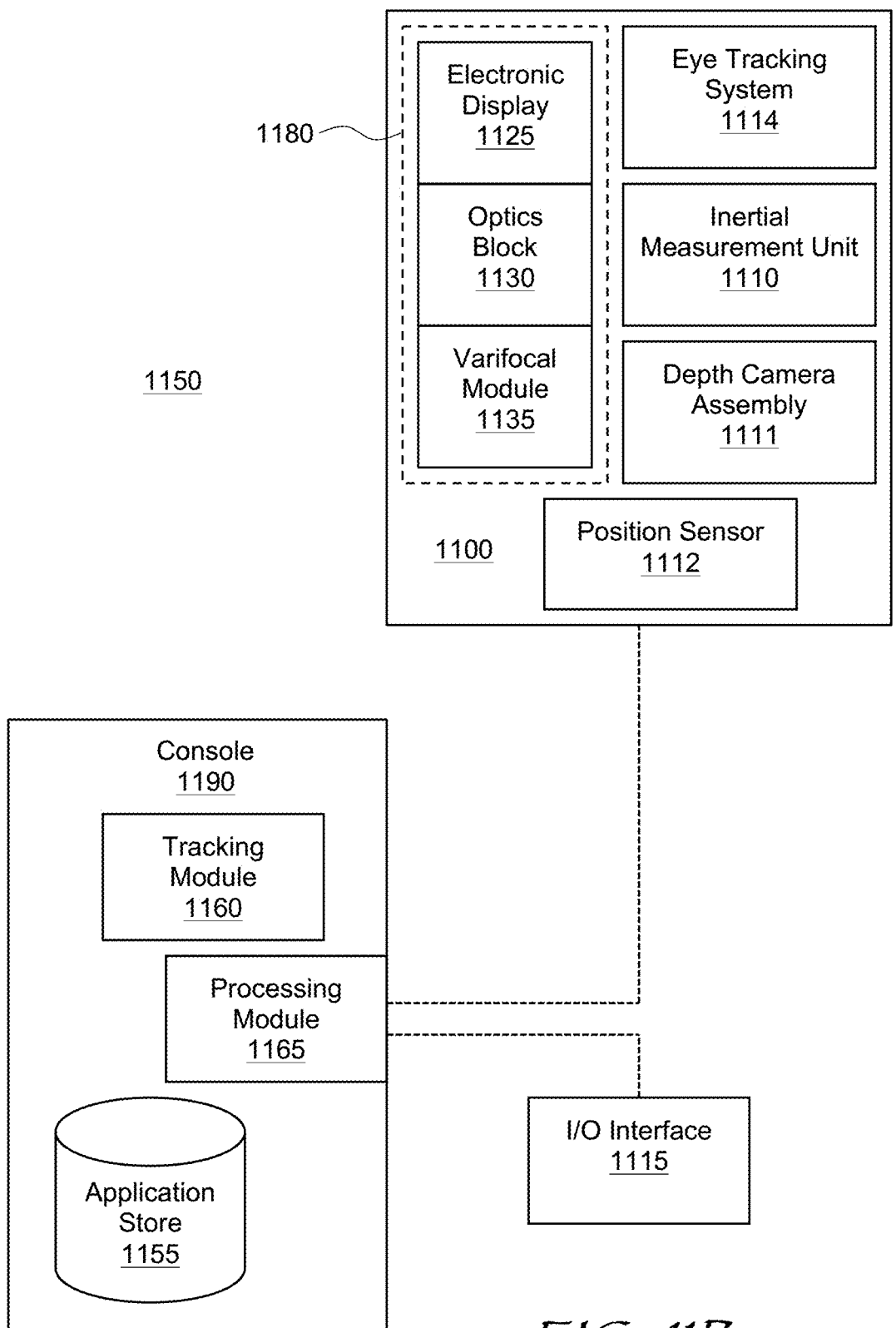
FIG. 11B is a block diagram of a virtual reality system including the headset of FIG. 11A.

Referring to FIG. 11B, an AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may recalibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model. The local area model may include brightness of different areas, which may be used for local dimming as described above.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze.

The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A configurable occluder comprising:
a first polarizer for polarizing an impinging light beam to obtain a first light beam having a first polarization state;
an array of polarization rotators downstream of the first polarizer, for receiving the first light beam and changing polarization of the first light beam in a spatially selective manner from the first polarization state to a second polarization state orthogonal to the first polarization state, to obtain a second light beam;
a polarization-selective scatterer downstream of the array of polarization rotators, for receiving the second light beam and scattering a first portion of the second light beam having one of the first or second polarization states while transmitting, substantially without scattering, a second, remaining portion of the second light beam having the other one of the first or second polarization states; and a second polarizer downstream of the polarization-selective scatterer, for transmitting therethrough the second portion of the second light beam while blocking the first portion.

2. The configurable occluder of claim 1, wherein the polarization-selective scatterer comprises a polymer-stabilized liquid crystal layer comprising liquid crystal molecules dispersed in and aligned by a polymer network extending in a direction perpendicular to a plane of polarization of the second portion of the second light beam, whereby the liquid crystal molecules are oriented to have a uniform refractive index for the second portion of the second light beam, and a different, spatially varying refractive index for the first portion of the second light beam, for scattering the first portion of the second light beam.

3. The configurable occluder of claim 2, wherein the polarization-selective scatterer further comprises first and second transparent electrodes, wherein the polymer-stabilized liquid crystal layer is disposed between the first and second transparent electrodes for electric control of amount of scattering of the first portion of the second light beam by the polymer-stabilized liquid crystal layer.

4. The configurable occluder of claim 3, wherein at least one of the first or second transparent electrodes is pixelated for spatially-selective control of the amount of scattering of the first portion of the second light beam.

5. The configurable occluder of claim 1, wherein the polarization-selective scatterer comprises a polymer-dispersed liquid crystal layer comprising liquid crystal droplets dispersed in a polymer network, wherein liquid crystal molecules in the droplets are aligned predominantly in a direction perpendicular to a plane of polarization of the second portion of the second light beam, whereby the liquid crystal molecules are oriented to have a uniform refractive index for the second portion of the second light beam, and a different, spatially varying refractive index for the first portion of the second light beam, for scattering the first portion of the second light beam.

6. The configurable occluder of claim 5, wherein the polarization-selective scatterer further comprises first and second transparent electrodes, wherein the polymer-dispersed liquid crystal layer is disposed between the first and second transparent electrodes for electric control of amount of scattering of the first portion of the second light beam by the polymer-dispersed liquid crystal layer.

7. The configurable occluder of claim 6, wherein at least one of the first or second transparent electrodes is pixelated for spatially-selective control of the amount of scattering of the first portion of the second light beam.

8. The configurable occluder of claim 1, wherein the first and second polarization states are circular polarization states of opposite handedness;
wherein the polarization-selective scatterer comprises a polarization volume hologram comprising liquid crystal molecules in a periodic cholesteric configuration including a plurality of helical structures, whereby the liquid crystal molecules are oriented to have a uniform refractive index for the second portion of the second light beam, and a different, spatially varying refractive index for the first portion of the second light beam, for scattering the first portion of the second light beam.

9. The configurable occluder of claim 8, wherein the polarization-selective scatterer further comprises first and second transparent electrodes, wherein the polarization volume hologram is disposed between the first and second transparent electrodes for electric control of amount of scattering of the first portion of the second light beam by the polarization volume hologram.

10. The configurable occluder of claim 9, wherein at least one of the first and second transparent electrodes is pixelated for spatially-selective control of the amount of scattering of the first portion of the second light beam.

11. The configurable occluder of claim 1, wherein the first and second polarization states are circular polarization states of opposite handedness;
wherein the polarization-selective scatterer comprises a Pancharatnam-Berry polarization-selective diffuser configured to scatter the first portion of the second light beam while flipping its polarization handedness, and transmit the second portion of the second light beam while flipping its polarization handedness.

12. The configurable occluder of claim 1, wherein the array of polarization rotators comprises a liquid crystal array.

13. A see-through near-eye display device comprising:
a configurable occluder comprising:
a first polarizer for polarizing a light beam impinging onto the first polarizer from outside, to obtain a first light beam having a first polarization state;
an array of polarization rotators downstream of the first polarizer, for receiving the first light beam and changing polarization of the first light beam in a spatially selective manner from the first polarization state to a second polarization state orthogonal to the first polarization state, to obtain a second light beam;
a polarization-selective scatterer downstream of the array of polarization rotators, for receiving the second light beam and scattering a first portion of the second light beam having one of the first or second polarization states while transmitting, substantially without scattering, a second, remaining portion of the second light beam having the other one of the first or second polarization states; and
a second polarizer downstream of the polarization-selective scatterer, for transmitting therethrough the second portion of the second light beam while blocking the first portion; and
a see-through display module downstream of the configurable occluder, for providing display light conveying an image in angular domain to a user, and for transmitting light propagated through the second polarizer of the configurable occluder.

14. The see-through near-eye display device of claim 13, wherein the see-through display module is transparent at a polarization state of the second portion of the second light beam, and wherein the display light is polarized orthogonally to the polarization state of the second portion of the second light beam.

15. The see-through near-eye display device of claim 13, wherein the see-through display module comprises a pupil-replicating waveguide and an image projector optically coupled to the pupil-replicating waveguide for providing the display light thereto.

16. The see-through near-eye display device of claim 13, further comprising a controller operably coupled to the see-through display module and the array of polarization rotators, and configured to:
obtain an image to be displayed to the user, the image including an occluding region to occlude a corresponding portion of outside environment carried by a portion of external light;

operate the array of polarization rotators of the configurable occluder to dim the corresponding portion of the outside environment by blocking the portion of the external light; and operate the see-through display module to provide the display light carrying the image to be displayed.

17. The see-through near-eye display device of claim 16, further comprising an eye tracker for determining at least one of position or orientation of an eye of the user, wherein the controller is further configured to:

use the eye tracker to determine the at least one of the eye position or orientation of the eye of the user;

determine parallax of an occluding area of the configurable occluder corresponding to the occluding region of the image, in accordance with the at least one of the eye position or orientation; and adjust the occluding area to account for the parallax of the occluding area.

18. A see-through near-eye display device comprising:
a tunable dimmer comprising:
  a first polarizer for polarizing light from outside environment to obtain a first light beam having a first polarization state;
  a tunable polarization rotator downstream of the first polarizer, for receiving the first light beam and changing polarization of the first light beam by a controllable amount, to obtain a second light beam;
  a polarization-selective scatterer downstream of the tunable polarization rotator, for receiving the second light beam and scattering a first portion of the second light beam having one of first or second polarization states while transmitting, substantially without scattering, a second, remaining portion of the second light beam having the other one of the first or second polarization states; and
  a second polarizer downstream of the polarization-selective scatterer, for transmitting therethrough the second portion of the second light beam while blocking the first portion of the second light beam; and
a see-through display module downstream of the tunable dimmer, for providing display light conveying an image in angular domain to a user, and for transmitting light propagated through the second polarizer of the tunable dimmer.

19. The see-through near-eye display device of claim 18, further comprising:

an eye tracker for determining at least one of position or orientation of an eye of the user;

a camera for determining brightness of the outside environment; and a controller operably coupled to the see-through display module, the tunable polarization rotator, the camera, and the eye tracker, and configured to:

use the eye tracker to determine a gaze direction of the user;

use the camera to determine brightness of the outside environment in the gaze direction;

operate the tunable polarization rotator of the tunable dimmer to dim the outside environment in accordance with the brightness of the outside environment in the gaze direction; and operate the see-through display module to provide the image to be displayed to the user.

20. The see-through near-eye display device of claim 18, wherein the tunable polarization rotator is pixelated for spatially varying a polarization state of the second light beam to dim the outside environment in a spatially-variant manner, the see-through near-eye display device further comprising:

a camera for determining an angular distribution of brightness of the outside environment; and a controller operably coupled to the see-through display module, the tunable polarization rotator, and the camera, and configured to:

use the camera to determine an angular distribution of brightness of the outside environment;

operate the pixelated tunable polarization rotator of the tunable dimmer to dim the outside environment in a spatially-variant manner in accordance with the angular distribution of brightness of the outside environment; and operate the see-through display module to provide the image to be displayed to the user.

\* \* \* \* \*